US008855600B2

(12) United States Patent
Velusamy (10) Patent No.: US 8,855,600 B2
(45) Date of Patent: Oct. 7, 2014

(54) METHOD AND SYSTEM FOR AUTHENTICATING A NON-NATIVE USER OF A MOBILE DEVICE

(75) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 895 days.

(21) Appl. No.: 12/643,436

(22) Filed: Dec. 21, 2009

(65) Prior Publication Data

US 2011/0151835 A1 Jun. 23, 2011

(51) Int. Cl.
*H04M 1/66* (2006.01)
*G06F 21/00* (2013.01)
*H04L 29/06* (2006.01)
*H04W 12/06* (2009.01)
*H04W 84/12* (2009.01)
*H04W 28/04* (2009.01)
*H04M 3/38* (2006.01)

(52) U.S. Cl.
CPC ............... *H04M 1/66* (2013.01); *H04W 84/12* (2013.01); *H04W 28/04* (2013.01); *H04L 63/0861* (2013.01); *H04W 12/06* (2013.01); *H04M 3/38* (2013.01)

USPC .......................................... 455/411; 713/186

(58) Field of Classification Search
CPC ..................... H04W 12/00–12/12; H04M 1/66
USPC .......................................... 455/411; 713/186
See application file for complete search history.

(56) References Cited

U.S. PATENT DOCUMENTS

| 7,274,925 | B2 * | 9/2007 | Chaar et al. | 455/405 |
|---|---|---|---|---|
| 7,447,772 | B2 * | 11/2008 | Natsuno et al. | 709/225 |
| 8,423,784 | B2 * | 4/2013 | Akama | 713/186 |
| 2007/0142033 | A1 * | 6/2007 | Deas et al. | 455/411 |
| 2008/0051062 | A1 * | 2/2008 | Lee | 455/411 |
| 2009/0221265 | A1 * | 9/2009 | Liu et al. | 455/411 |

* cited by examiner

*Primary Examiner* — Dwayne Bost
*Assistant Examiner* — Larry Sternbane

(57) ABSTRACT

An approach for permitting an unregistered user of a mobile device to utilize a communication service. It is detected that a user of a mobile device is not registered with a service provider to utilize the mobile device. Authentication information supplied by the user of the mobile device is collected. A request, including the authentication information, is generated for using a communication service of the service provider. In response to the request, an acknowledgement message is selectively received granting permission for the user to utilize the communication service if the authentication information is valid.

17 Claims, 9 Drawing Sheets

METHOD AND SYSTEM FOR AUTHENTICATING A NON-NATIVE USER OF A MOBILE DEVICE

BACKGROUND INFORMATION

The mobile industry continues to mature and enjoy great success, in which consumers' usage of services are ever increasing. Consequently, the number and types of mobile devices (e.g., handsets), with varying levels of sophistication available to consumers, are also growing at a high rate. Undoubtedly, mobile devices have become an integral part of life. Hence, the unavailability of a device, even temporarily, can be gravely disruptive, particularly in the context of business communications. Moreover, in addition to variety in equipment, there are many choices of service providers and associated services that the various mobile devices can engage in or subscribe to. Traditionally, users are tied to particular mobile devices as part of their subscriptions to these wireless services. As a result, consumers are severely restricted in their ability to freely use other mobile devices.

Based on the foregoing, there is a need for an approach that permits usage of mobile devices irrespective of whom the devices are registered to, as to minimize unavailability of wireless communication service.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and system for authenticating a user using authentication information (e.g., biometric data) in the absence of a user identification module within a mobile device is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile station, it is contemplated that various exemplary embodiments are also applicable to stationary devices.

Figure 1:
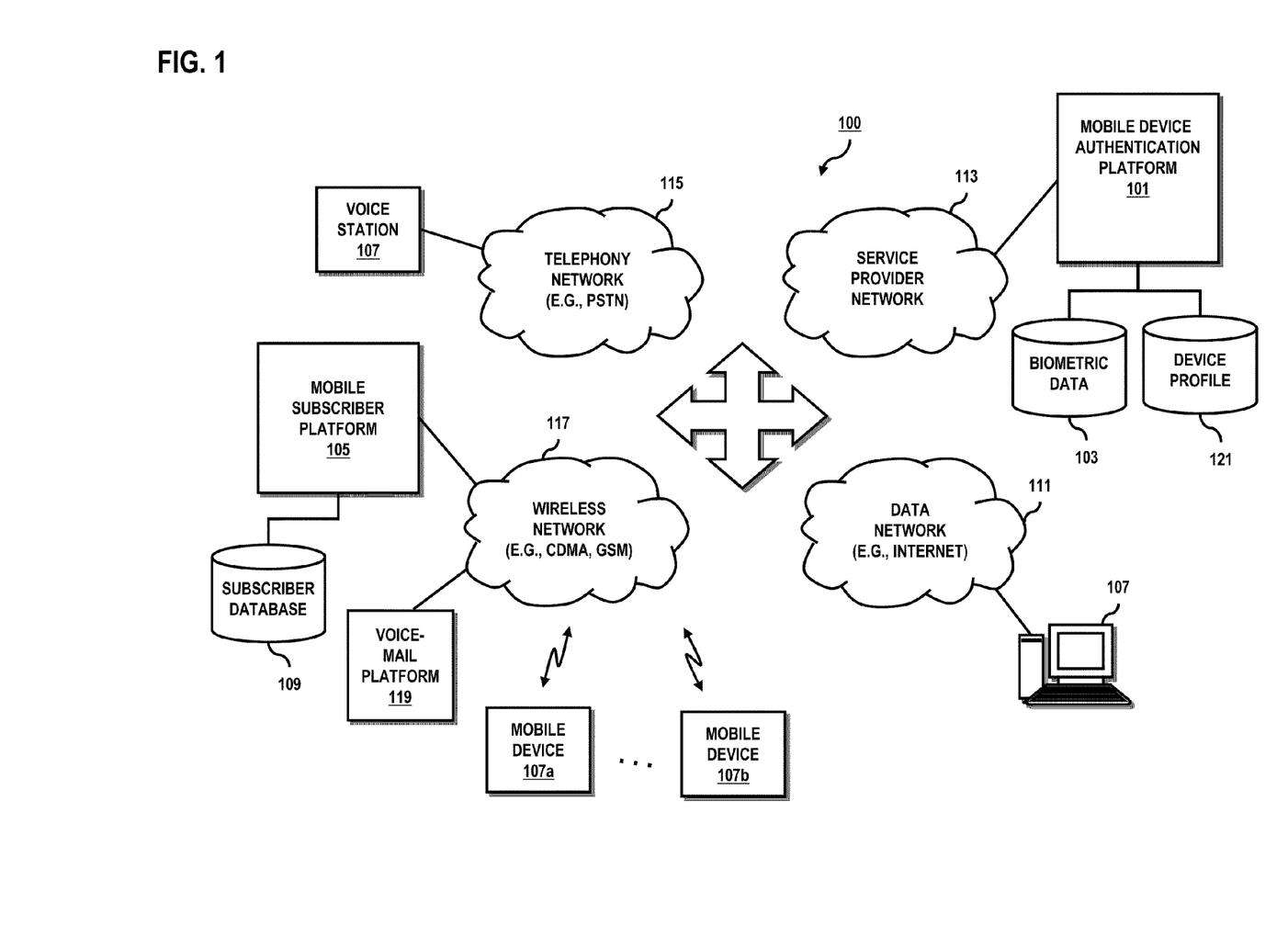
FIG. 1 is a diagram of a communication system capable of authenticating of a non-native user of a mobile device to establish a communication session, according to various embodiments.

FIG. 1 is a diagram of a communication system capable of authenticating of a non-native user of a mobile device to establish a communication session, according to various embodiments. For illustrative purposes, system 100 is described with respect to a service provider supplying one or more communication services, including a wireless communication service, in which a mobile device authentication platform 101 permits a user, who is not registered with the service provider to engage in a particular service using a particular mobile device, to undergo an authentication process using that particular mobile device. Such mobile device is typically registered with another user. Under this scenario, the mobile device authentication platform 101 maintains a database 103 that stores authentication information, which can include biometric data, according to certain embodiments. The mobile device authentication platform 101 can communicate with a mobile subscriber platform 105 to configure subscriber account information and parameters relating to the wireless communication service, which serves one or more mobile devices 107. Other end user devices include a computer as well as a voice station. As shown, the mobile subscriber platform 105 utilizes a subscriber database 109 to store various user account information and service requirements and configuration information.

In system 100, according to certain embodiments, one or more networks, such as data network 111, service provider network 113, telephony network 115, and/or wireless network 117, are provided to handle various communication sessions, voice communications as well as non-voice communications. Networks 111-117 may be any suitable wireline and/or wireless network, and be managed by one or more service providers. For example, telephony network 115 may include a circuit-switched network, such as the public switched telephone network (PSTN), an integrated services digital network (ISDN), a private branch exchange (PBX), or other like network. Wireless network 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 111-117 may be completely or partially contained within one another, or may embody one or more of the aforementioned infrastructures. For instance, service provider network 113 may embody circuit-switched and/or packet-switched networks that include facilities to provide for transport of circuit-switched and/or packet-based communications. It is further contemplated that networks 111-117 may include components and facilities to provide for signaling and/or bearer communications between the various components or facilities of system 100. In this manner, networks 111-117 may embody or include portions of a signaling system 7 (SS7) network, or other suitable infrastructure to support control and signaling functions.

According to exemplary embodiments, end user devices 107 may include any customer premise equipment (CPE) capable of sending and/or receiving information over one or more of networks 111-117. For instance, voice terminal 107 may be any suitable plain old telephone service (POTS) device, facsimile machine, etc., whereas mobile device (or terminal) 107 may be any cellular phone, radiophone, satellite phone, smart phone, wireless phone, or any other suitable mobile device, such as a personal digital assistant (PDA), pocket personal computer, tablet, customized hardware, etc. Further, computing device 107 may be any suitable computing device, such as a VoIP phone, skinny client control protocol (SCCP) phone, session initiation protocol (SIP) phone, IP phone, personal computer, softphone, workstation, terminal, server, etc.

By way of example, the approach of system 100 for permitting an unregistered (or non-native) user of a mobile device to utilize a communication service is explained with the wireless network 117 employing GSM.

Currently users of GSM phones can remove a user identification module, e.g., a subscriber identity module (SIM) card, from the mobile phone and insert the SIM card into a new phone. The SIM card can store information to identify a subscriber—i.e., a service-subscriber key (IMSI). This card can also contain security authentication and ciphering information, as well as information about the services available to the user. Upon placement of the SIM card into the new phone, the phone will operate without interruption of service. However, if the users do not have a SIM card, the phone is rendered inoperable. For example, a user may lose the SIM card, such would be a common scenario in regions that support pre-paid SIM cards, for example.

Therefore, the approach of system 100, according to certain exemplary embodiments, stems from the recognition that mobile devices (in which user authentication module is unavailable) constitutes wasted or underutilized resources, not to mention a source of inconvenience (even aggravation) for users. Also, it is recognized that current systems that tie users to particular mobile devices lack flexibility with respect to the users' experience and accessibility to communication resources.

By way of example, the mobile device authentication platform 101 allows users employ any wireless device as their own (e.g., for a temporary period) by uniquely identifying and authenticating themselves. In certain embodiments, these users, who are not registered with a wireless service provider to use the subject wireless devices, are considered "non-native" users, and thus, the devices are referred to as "non-native devices." Conversely, registered users and associated devices are denoted, respectively, as "native users or native devices." In this example, mobile device 107a is assumed to be a non-native device with respect to a particular user. The mobile device 107a requests authentication from the network (e.g., wireless network 117 and/or service provider network 113) to permit use of the non-native device 107a over the network. Once the authentication is completed in the non-native device 107a, the device 107a may obtain the details necessary from the network 113, which will be used to present service options in the non-native device 107a as if it were a native device. As mentioned, this capability can be designated as temporary; and thus, once this temporary mode expires, the device 107a returns back to its original state. According to certain embodiments, the users will be able to effect the above approach just by biometrically identifying themselves, which can be used to both uniquely identify and authenticate the users using non-native devices to emulate their original devices. It is noted that the biometric authentication mechanism may be replaced with (or/and operated with) other authentication mechanism as well; e.g., multiple passphrase challenges as well as other identification details, etc.

By way of example, the mobile device 107a can include or can gain access to a biometric identification mechanism to conduct, for instance, a retina scan, facial scan, voice print, finger print, palm vein reader, etc. The non-native user using the mobile device 107a can invoke an application to biometrically authenticate himself/herself. According to certain embodiments, once such initial authentication is complete, additional authentication mechanism can invoked, such as passphrase challenge. That is, the authentication mechanism may verify user provided credential information, which can be stored within a user profile of, for instance, subscriber database 109. In one example, the credential information may include "log on" information corresponding to a user name, password, coded key, or other unique identification parameter, such a personal identification number (PIN). In other instances, the credential information may include any one or combination of a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., bearer tag identifier, etc.

Thereafter, the appropriate components (e.g., switches) of wireless network 117 is updated, incoming calls can be routed to this device 107a for the non-native user. In one embodiment, information that the user has pre-configured can be downloaded to this "new" device 107a, such that the information can configured for presentation by the device 107a. For example, the information may include the user's own contact list, images, call log, calling plan, call usage information, balance, and etc. Any communication session (e.g., call) that is made can be counted towards the new users' cell phone account (as tracked in subscriber platform 105 and database 109, for instance). Under this arrangement, the mobile device 107a becomes the user's "own" device for the period of time the user chooses to use the device 107a.

The system 100 can implement, in one embodiment, a wireless application (e.g., resident within mobile device 107a) that can exchange data through the user's data plan, without compromising the ability of the native user's ability to make or receive calls. The native user can receive and initiate calls through a "regular" channel of network 117, whereas the non-native users' call will be routed through the data network 111—using, for instance, voice over internet protocol (VoIP) on demand application. This application can be launched on the device 107c. According to one embodiment, the "borrowed" (or non-native) mobile device 107a essentially becomes the user's own device with respect to functionalities, with the exception that communication sessions (e.g., voice calls) are established via data channels rather than voice channels.

Using the borrowed mobile device 107a, the user can authenticate through the user's own wireless provider, e.g., wireless network 117, which has an account for this user as maintained within subscriber database 109. In one embodiment, this authentication process can be executed via an authentication application via the data network 111, wherein the user dials the user's directory number (i.e., phone number) and is authenticate through a voicemail platform 119, specifying the borrowed device as a target device (e.g., mobile device 107a) for a VoIP application. Once the user is authenticated with the service provider, the service provider can identify the type of device the user has borrowed, as well as the network the device is on and the devices data network capabilities. This process can be either automatically performed by the network (e.g., service provider network 113) or the user can manually specify the type of device, as well as data and voice network capabilities.

By way of example, the service provider can either push a VoIP application to the device 107a, or send an SMS/MMS message to the device 107a enabling the user of the device 107a to pull the VoIP application. As mentioned, the VoIP application can supply calling functionality on the borrowed device 107a via the data network 111, as the user of data services will minimize cost for supporting the communication sessions initiated by the non-native device 107a.

According to one embodiment, the application can provide a customized graphical user interface (GUI) to resemble the user's regular native device (such information can be maintained within subscriber database 109)—for example, the application can duplicate the display and key mapping of that device 107a. Additionally, the user's personal information (contacts, appointments, data storage such as images and video) can also be network resident and available to the application via the network 117. This device configuration information can be downloaded to the target device, i.e., device 107a. Therefore, the described arrangement can enable users to readily utilize the mobile devices of other users, while preserving the look-and-feel of the user's native device.

Accordingly, the service provider can maintain a database 121 of target device profile and capability data so that the application that is launched on the target device 107a (i.e., the borrowed device) is validated on that device 107a to work. It is noted that if the wireless network 117 is governed by the same service provider of network 113, then the device profile database 121 can also be implemented at the mobile subscriber platform 105.

Furthermore, the database 121 can store configuration information of devices that can be utilized to emulate the capabilities of one device on another device. In other words, the service provider can determine the capabilities, applications, features, and communication services (as part of the configuration information) associated with the user's native device, and implement to the extent possible these features and services on the non-native (or borrowed) device. With this configuration information, the platform 101 can attempt to emulate by activating the features and services that the user is accustomed to, but provided by the borrowed device 107a. Moreover, if the user maintains data (e.g., contact lists, calendar information, etc.) within the service provider network 113, such that the data can be made available to the user via the non-native device. In this manner, the user can essentially use any device to access the user's data without loss of functionality.

Among many advantages of the described authentication mechanism is that the user is not tied to a particular phone to utilize the communication service. That is, the user (i.e., non-native user) has the ability to use multiple devices (if the user has phones of differing capabilities and form factors) as well as other users' phones without expending those users' minutes (i.e., incur cost to the other users). Under this approach, for example, if the user loses his/her mobile device, the user can simply purchase another phone, biometrically authenticate himself/herself and immediately continue using the user's wireless service.

Figure 2A:
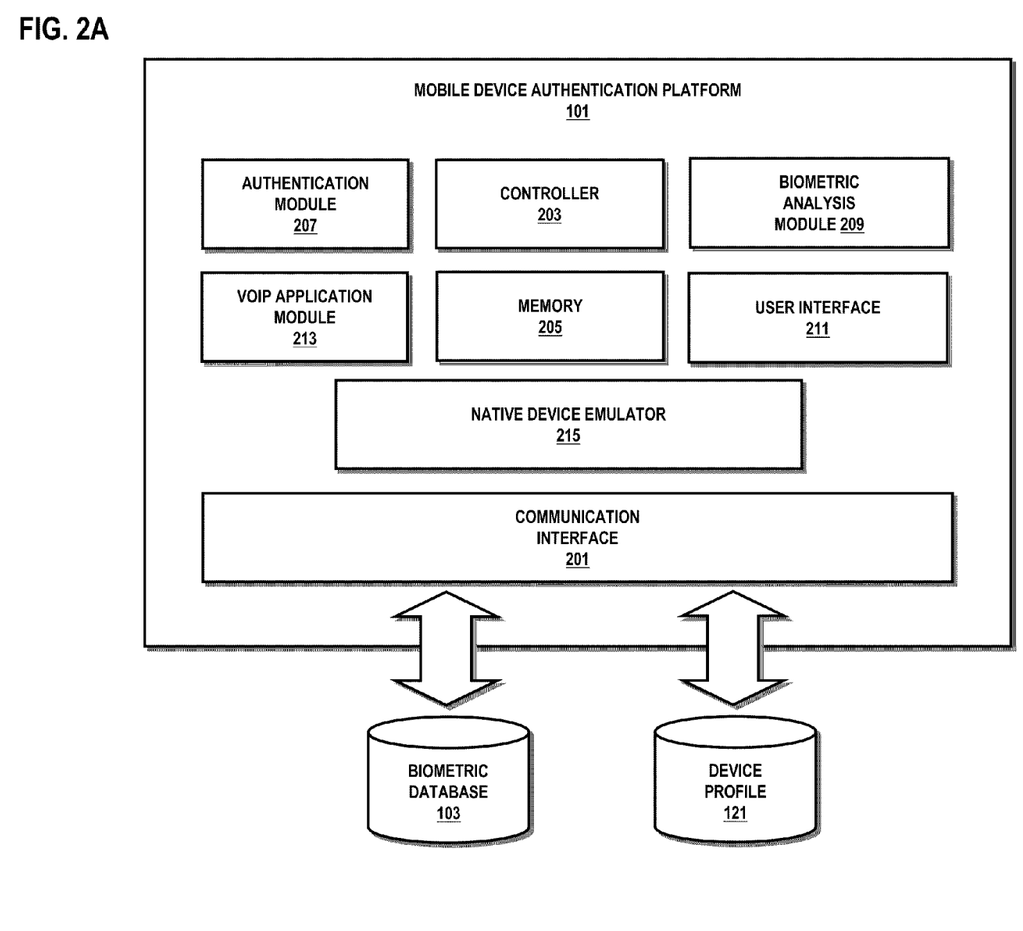
FIGS. 2A and 2B are diagrams of, respectively, a mobile device authentication platform and a mobile device utilized in the system of FIG. 1, according to one embodiment.
Figure 2B:
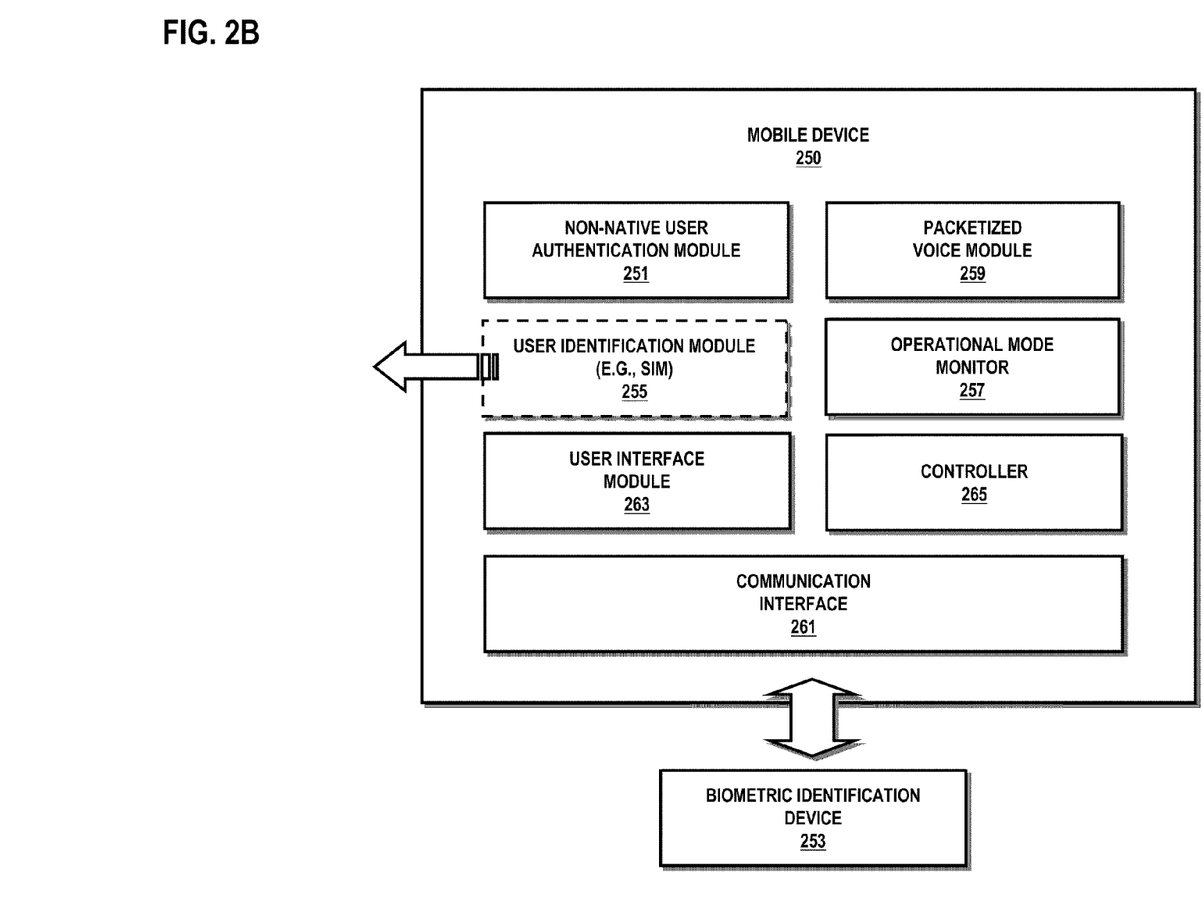

FIGS. 2A and 2B are diagrams of, respectively, a mobile device authentication platform and a mobile device utilized in the system of FIG. 1, according to one embodiment. As seen in FIG. 2A, mobile device authentication platform 101 may comprise computing hardware (such as described with respect to FIG. 7), as well as include one or more components configured to execute the processes described herein for providing the non-native mobile device authentication procedure of system 100. In one implementation, platform 101 includes communication interface 201, controller (or processor) 203, memory 205, authentication module 207, a biometric analysis module 209, and user interface module 211. Platform 101 may also communicate with one or more repositories, such as a biometric database 103. In one embodiment, platform 101 can access the subscriber database 109 directly.

Furthermore, the device database 121 can be maintained by the mobile device authentication platform 101 as part of the service provider network 113; alternatively, the device database 121 can be deployed within the wireless network 117 as a database local to the mobile subscriber platform 105. The device database 121, as explained, store configuration information and applications to permit the non-native user to possess similar functionality and look of the user's native device. According to one embodiment, device database 121 stores contact lists, calendar information, as well as media (e.g., images and video). When the borrowed device is authenticated, the device can be configured with these configuration information and applications. Depending on the make and model of the mobile devices (as well as services), equivalent features and functionalities need to be correlated for the emulation function to operate. As such, a native device emulator 215 can perform this correlation, and determine how to implement equivalent functionalities on the borrowed device. In this regard, the emulator 215 may query the device profile database 121 to compare the features of the subject devices (e.g., the non-native device and the native device) and invoke the necessary actions to "install" on a temporary basis the features and programs to effectively emulate the native device on the nonnative device. By way of example, if the non-native device does not have data service, but the non-native user wishes to use email, the platform 101 would activate the data service on the borrowed device, on a temporary basis. This process is further detailed with respect to FIG. 6. According to one embodiment, this emulation capability can be provided as a subscription service by the service provider.

In this example, the platform 101 may communicate directly with one or more switches (not shown) within the telephony 117, or may be integrated with the telephony signaling network as an intelligent peripheral or processor, for instance. While specific reference will be made to this particular implementation, it is also contemplated that platform 101 may embody many forms and include multiple and/or alternative components. For example, it is contemplated that the components of platform 101 may be combined, located in separate structures, or separate locations.

According to one embodiment, platform 101 embodies one or more application servers over one or more networks 113-117.

According to some embodiments, authentication module 207 for provides for authentication of non-native users of mobile devices using unique authentication information (or credential information) that is unique to the users and respective mobile devices 107a, 107b. An authentication schema may require interaction with biometric analysis module 209, which is configured to analyze biometric data received from a user. It is noted that the unique authentication information may further include a user name and password, a key access number, a unique machine identifier (e.g., media access control (MAC) address), etc., as well as a combination thereof. However, in one embodiment, only the biometric data generated from the mobile device (e.g., device 107a) is utilized.

The authentication module 207, in conjunction with the biometric analysis module 209, can process the biometric data generated by mobile device 107a, in which the biometric analysis module 209 can ensure that the biometric data complies with predetermined format and data structural requirements (e.g., protocol). This check is especially important if there lacks uniformity in the manner the mobile devices generate the biometric data. In any event, this capability permits more flexibility, and thus, facilitates more rapid adoption of this non-native user authentication approach. If the form of the biometric data is acceptable (as determined by the biometric analysis module 209), the authentication module 207 proceeds with known authentication schemes using the biometric data.

It is contemplated that the authentication module 207 may operate in concert with communication interface 201. That is, the authentication module may verify the biometric data acquired via communication interface 201 against corresponding biometric data stored within a user profile of subscriber database 109. Alternatively, a subset of the subscriber database can be stored locally in a user profile repository (not shown).

User interface 211 may be a web portal or other networked application, to permit user to access the features and functionality of platform 101 via devices 107. According to certain embodiments, user interface 211 may be configured via a web browser or other network-based application or system, such as a voice browser or interactive voice recognition system. This capability permits users, for instance, to directly register their devices to receive notifications.

As mentioned, the target device (e.g., mobile device 107a) may be supplied with a VoIP application. Thus, mobile device authentication platform 101 can include a VoIP application module 213 that can initiate a download of a VoIP application to mobile device 107a automatically or upon manual request by the non-native user.

According to certain embodiments, platform 101 may include a messaging module (not shown) that may be configured to generate control signals for transmission to device 107a utilizing any suitable bearer, such one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like. It is noted that these control signals can be used in lieu of "software code," and therefore, may be directly integrated into the control logic of mobile device 107a, thereby requiring less processing and hence, less power. It is contemplated, however, that coded instructions may also be utilized.

Additionally, platform 101 may include one or more controllers (or processors) 203 for effectuating the aforementioned features and functionality of the authentication processes of system 100, as well as one or more memories 205 for permanent and/or temporary storage of one or more of the aforementioned variables, parameters, information, signals, etc. In this manner, the features and functionalities of non-native user authentication may be executed by controller(s) 203 and/or memories 205, such as in conjunction with one or more of the various components of platform 101.

Figure 7:
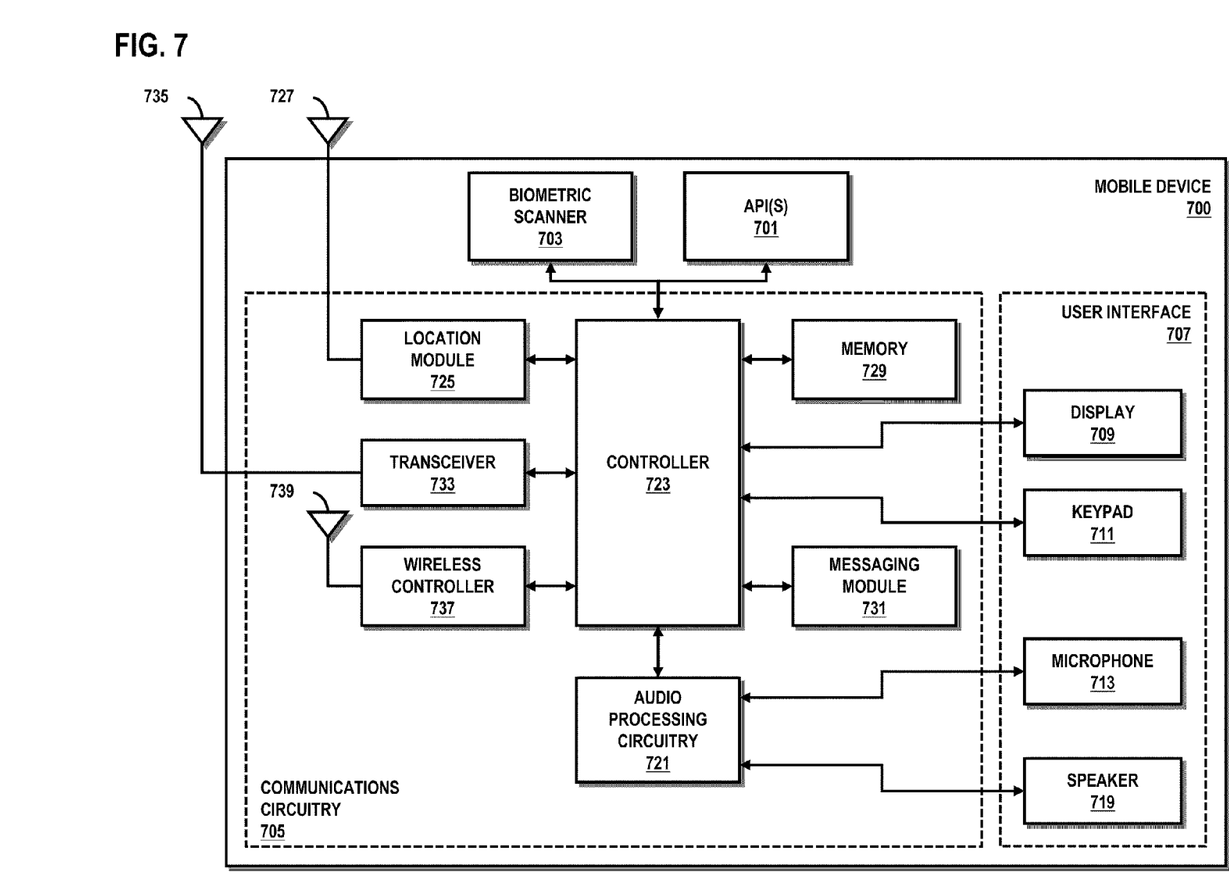
FIG. 7 is a diagram of a mobile device configured to acquire biometric data from a user, according to one embodiment.

On the user side, as shown in FIG. 2B, a mobile device 250, which may be a mobile device 107a of FIG. 1, includes a non-native user authentication module 251 that is configured to acquire authentication information from a non-native user. According to one embodiment, the mobile device 250 interfaces with a biometric identification device 253, which can acquire biometric data from the user based on, for instance, a retina scan, facial scan, voice print, finger print, palm vein reader, etc. Thus, the biometric identification device 253 can include one or more sensors to capture the described biometric data. In an alternative embodiment, the biometric identification device 253 be integrated (reside within) the mobile device 250, as illustrated in FIG. 7.

As shown, the mobile device 250 employs a user identification module 255, such as a subscriber identification module (SIM), to permit a native user to communicate over wireless network 117. However, as mentioned, if the SIM 255 is removed, the mobile device 250 can still retain the capability to communicate using functionality of the non-native user authentication module 251. This authentication module 251 can determine when the user identification module 255 is absent, and thus, initiate an alternative mode operation. This alternative mode of operation can be temporary; in this manner, an operational mode monitor 257 can track when and/or how the mobile device 250 reverts to normal operations. By way of example, the monitor 257 can transition the mobile device 250 according to an expiration period or time-based schedule. Alternatively, the monitor 257 can detect a triggering event to transition operational states. The settings or parameters associated with the monitor 257 is user (i.e., native user) configurable, in one embodiment.

Also, the device 250 includes, according to one embodiment, a packetized voice module 259 that is configured to establish a voice communication session over a data channel—e.g., using Voice over Internet Protocol (VoIP) technology. This method of communication can be set as a default during the alternative operational mode. Consequently, the cost of communication can be minimal or avoided (assuming voice communications over a data channel, such as VoIP, is significantly less costly vis-à-vis cellular voice channels). Additionally, or alternatively, once the network 117 "recognizes" the non-native user based on the biometric data, the network 117 can redirect any charges (e.g., minutes) to the account of the non-native user. In other words, the non-native user may be non-native with respect to mobile device 250, but is nonetheless a valid wireless subscriber with a separate account from the native user of the device 250.

Thus, communication interface 261 can be appropriately configured depending on the transport systems and networks, and whether packetized voice communications is invoked during the alternative operational mode. Although only a single interface 261 is shown, it is noted that multiple communication interfaces may be utilized, depending on the technologies involved.

Moreover, the user device 250 employs a user interface module 263 to enable control by the user of the device of these various communication sessions; in one embodiment, the user interface module 263 provides a graphical user interface (GUI). Additionally, a controller 265 is configured to coordinate the concurrent communication sessions provided by the user interface module 263 and voice module 259; for example, the controller 265 generates the appropriate signaling to control the communication interface 261 for transmissions over a voice channel and a data channel.

Figure 3:
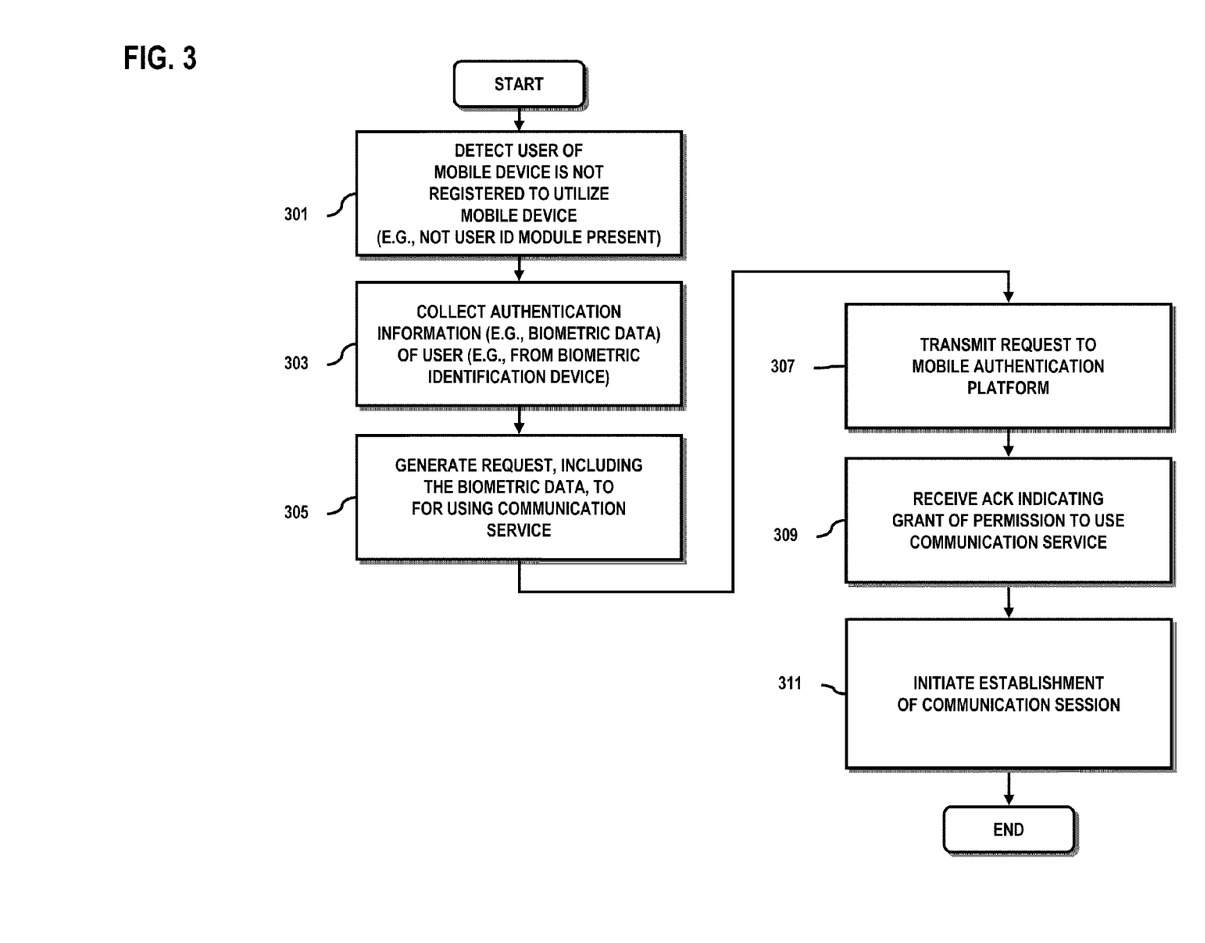
FIG. 3 is a flowchart of a process for utilizing biometric data for requesting authentication of a non-native user to initiate a communication session from a mobile device, according to one embodiment.

FIG. 3 is a flowchart of a process for utilizing biometric data for requesting authentication of a non-native user to initiate a communication session from a mobile device, according to one embodiment. For the purpose of explanation, this process is described with respect to the mobile device 250 of FIG. 2 as configured to operate in system 100 of FIG. 1. In step 301, mobile device 250, via the non-native user authentication module 251, detects that the user is not registered to utilize the mobile device 250. This detection can be based, in one embodiment, on determining that the user identification module 255 (e.g., SIM card) is not present in the device 250. Consequently, the process initiates an alternative mode of operation, whereby other authentication information, e.g., biometric data, is collected using the biometric identification device 253, per step 303. Upon receiving an appropriate command, the biometric identification device 253 scans the user to obtain biometric data.

In step 305, a request is generated by the device 250 to utilize a communication service of the wireless network 117. The communication service, in this example, is establishment of a voice communication session; alternatively, this communication service can, instead, be a messaging service (e.g., short message service/multimedia message service (SMS/MMS)), or email. The request is then transmitted, as in step 307, to the mobile device authentication platform 101 via the wireless network 117, which can detect the authentication request using appropriate signaling to forward the request to the platform 101.

At this point, the mobile device authentication platform 101 proceeds to verify the biometric data and generate an acknowledgement message, which specifies the granting of permission for the non-native user to utilize the wireless communication service of network 117. This process is more fully described below with respect to FIG. 4. Accordingly, in step 309, the mobile device 250 receives the acknowledgement message. Thereafter, the mobile device 250 can establish a communication session (step 311), e.g., voice call, over the network 117; in one embodiment, this voice call is carried over a data channel.

Figure 4:
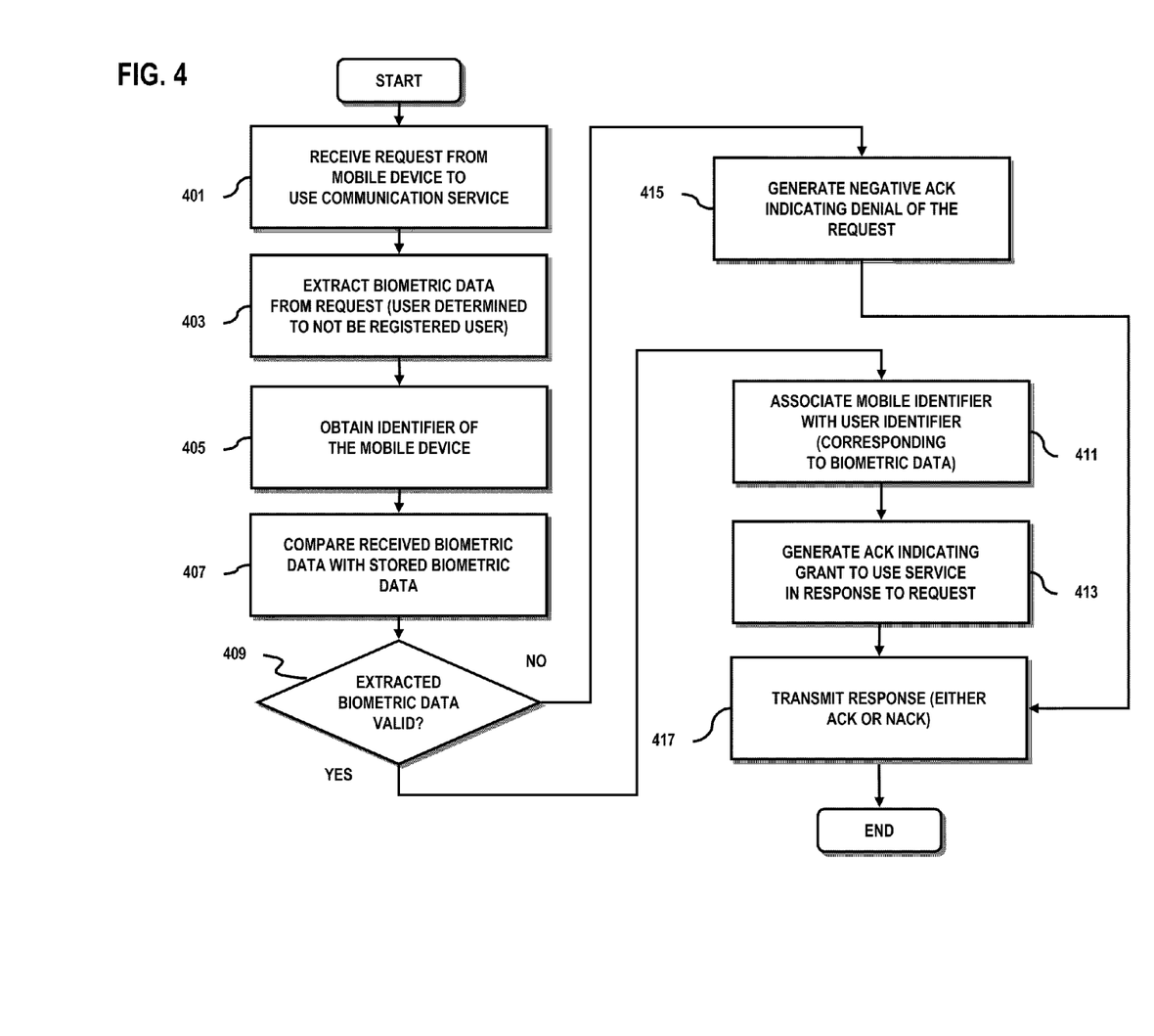
FIG. 4 is a flowchart of a process for authenticating a non-native user to engage in a communication service, according to one embodiment.

FIG. 4 is a flowchart of a process for authenticating a non-native user to engage in a communication service, according to one embodiment. On the network side, the request generated by the mobile device 250, in response to determining that the user is non-native, is relayed from the wireless network 117 to the mobile device authentication platform 101 over service provider network 113. In step 401, the request is received from the mobile device 250. As noted, this service provider network 113 can encompass the wireless network 117—which is the case if the service provider is a wireless service provider. In one embodiment, the mobile device authentication platform 101 determines that the request is for use of a communication service supported by the wireless network 117. In step 403, the process extracts authentication information (e.g., biometric data) that is included in the request message.

Next, the process obtains the identifier of the mobile device 250, as in step 405. It is noted that this step 405 can be optional, assuming the mobile device authentication platform 101 is capable of acquiring the identity of the mobile device 250 in another manner. In step 407, the process checks whether the received biometric data correlates to any biometric data that has been previously stored (within biometric data database 103) by comparing the received biometric data with the stored biometric data (step 407). Next, the process determines whether the extracted biometric data is valid based on the comparison, as in step 409.

In step 411, the mobile identifier (as obtained in step 405) is associated with a user identifier (corresponding to the received biometric data), after the biometric data is declared valid. An acknowledgement (ACK) message is then generated; such message can indicate that a grant is provided for permission to establish a communication session over the wireless network 117, per step 413.

However, if the received biometric data is determined to be invalid, in step 409, a negative acknowledge message (or equivalent) can be created to indicate a denial of the request (step 415). This denial can occur, for example, if the mobile device 250 has been reported stolen, lost, etc.

Thereafter, depending on whether the biometric data is valid or not, the response (i.e., ACK or NACK message) is transmitted, as in step 417, to the mobile device 250.

Figure 5:
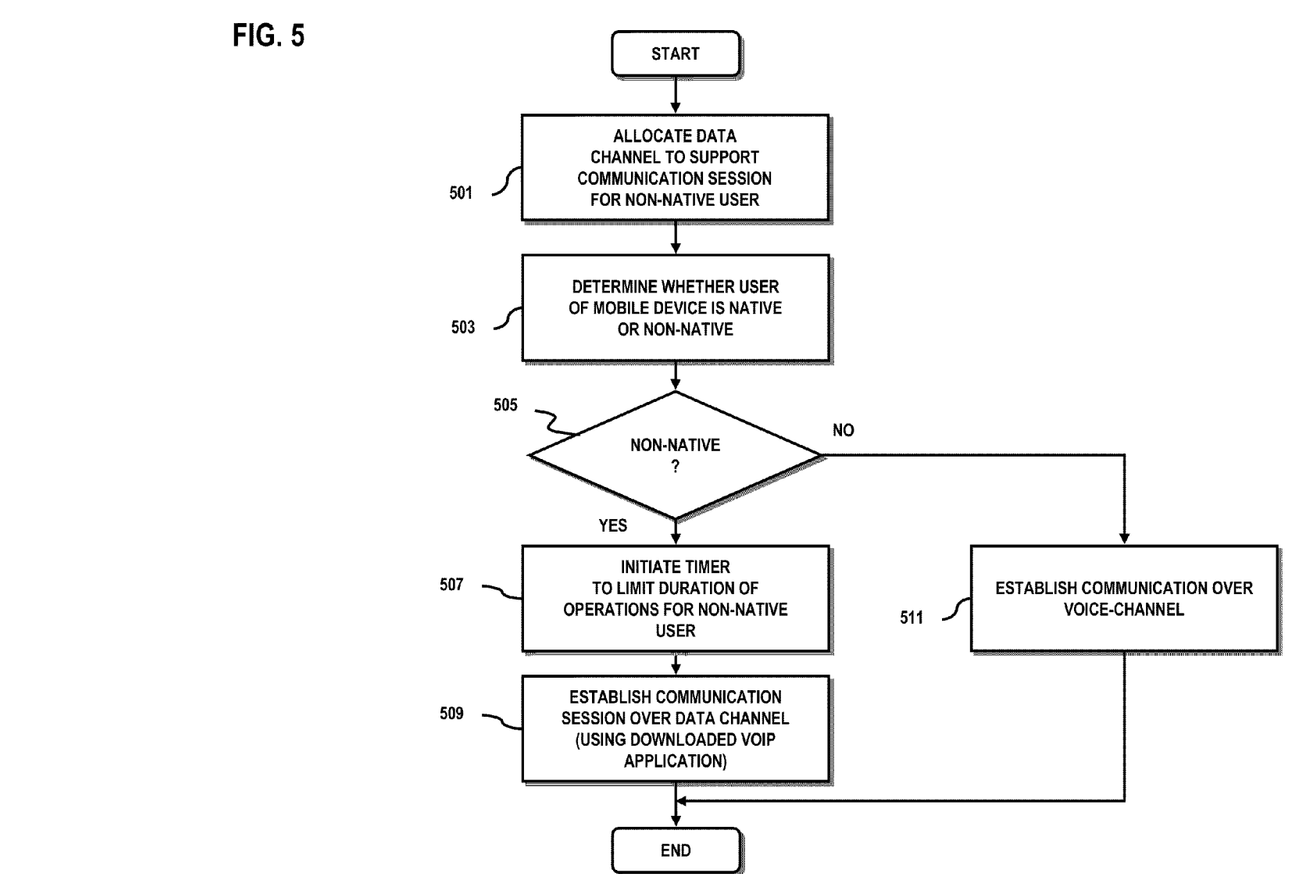
FIG. 5 is a flowchart of a process for determining whether a user is a native or a non-native user of a mobile device, according to one embodiment.

FIG. 5 is a flowchart of a process for determining whether a user is a native or a non-native user of a mobile device, according to one embodiment. As previously explained, the approach of the mobile device authentication platform 101 can involve pre-allocating only "inexpensive" (less costly) communication means for use in supporting non-native users. By way of example, in step 501, a data channel is allocated (or pre-designated) to support communication sessions for non-native users. In view of this, the process determines whether the user of the mobile device is a native user (if information from the SIM card is received), or a non-native, per steps 503 and 505.

According to one embodiment, the time duration for operating a state that supports non-native users can be enforced on the network end (as opposed to the user device side as shown in FIG. 2B, whereby the operational mode monitor 257 is executed on the mobile device 250). In the example of FIG. 5, it is assumed that mobile device authentication platform 101 performs the timing function to limit the duration of the operations for the non-native user. That is, after the expiration, the non-native user will not be permitted to utilize the wireless network service of network 117 any longer. Upon the expiration of this time, the non-native user may be prompted to re-authenticate, for example. In other words, the non-native user associated with mobile device 250 can be prompted to re-authenticate. In one embodiment, the user may be asked to undergoing the same authentication procedure with respect to the biometric, as to avoid the mobile device 250 being totally "open" to any and all users.

In step 507, according to one embodiment, the process determines that the user is non-native, and thus, initiates a timer to permit the non-native user restricted use of the communication service. At this point, the process can optionally determine whether the mobile device 250 has a packetized voice application (e.g., VoIP application) resident within the device 250 to permit establishment of a voice call over a data channel. If no application exists, the process can download the VoIP application to the mobile device 107a. Hence, the non-native can talk using VoIP over a data channel, as in step 509. Furthermore, the process permits the mobile device 107a to download device configuration information to enable this "borrowed" device 107a to be configured with applications and settings to provide a look-and-feel that resembles this user's native device. Under this scenario, the user is assumed to be a subscriber of a wireless communication service (but associated with a different mobile device); it is this native device's configuration information that can be stored within the service provider network 113 for this purpose.

If, within step 505, the process determines that the user is a native user. Thus, the user can establish a communication session over the wireless network 117 according to the normal process. For example, a voice call can be established using a voice-channel, as compared to a data channel, as in step 511.

As mentioned, in certain embodiments, non-native users may utilize borrowed devices that can be reconfigured, on a temporary basis, according to device profiles of the non-native users.

Figure 6:
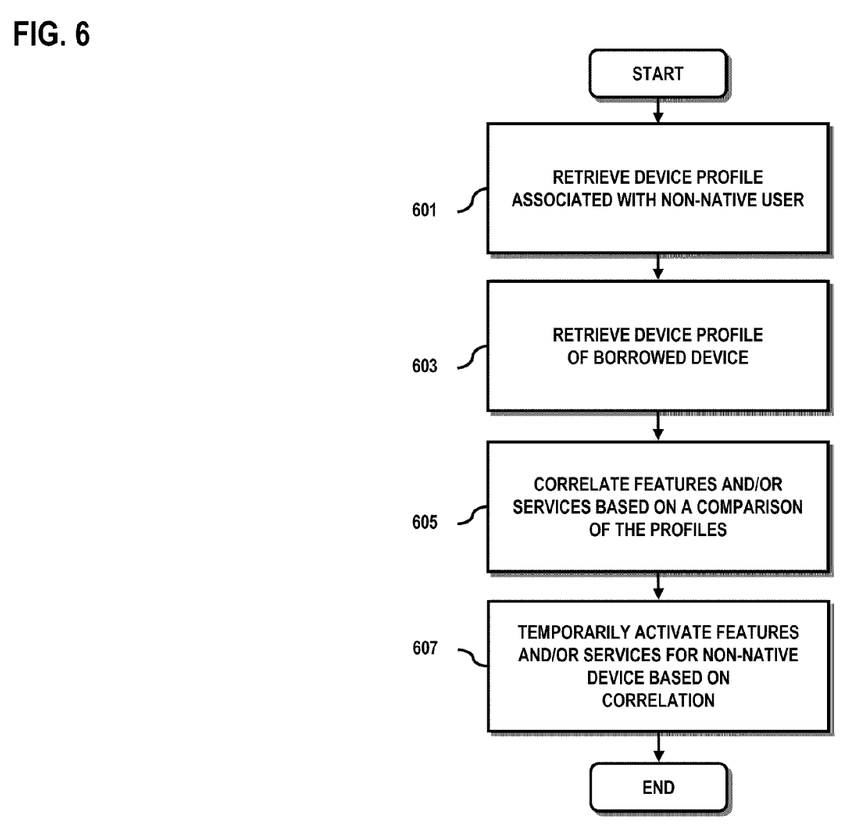
FIG. 6 is a flowchart of a process for emulating a non-native user's device profile on a non-native device, according to one embodiment.

FIG. 6 is a flowchart of a process for emulating a non-native user's device profile on a non-native device, according to one embodiment. The process, by way of example, is described with respect to the native device emulator 215 of FIG. 2A. In step 601, the emulator 215 retrieves the device profile of the non-native user—i.e., profile associated the user's native device (assuming such user has a registered device), which is currently unavailable. The device profile can include configuration information relating to the functionalities of the user's native device and services, as well as parameters relating to the user interface. In step 603, the device profile of the borrowed device is retrieved from device profile database 121. If the non-native user is a subscriber to the same (or common) service provider as the borrowed device, then the device profile of the non-native user can be maintained in the device profile database 121, according to one embodiment. Alternatively, the emulator 215 can access the device profile information from another service provider system.

Next, the emulator 215 can correlate the profiles; specifically, each of the features and/or services is correlated based on a comparison of the profiles, as in step 605. For example, if the non-native user has a device profile that indicates a particular VoIP application/provider, the emulator 215 would attempt to find the specific VoIP application/provider or a comparable substitute. As another example, the device profile of the non-native user indicates certain call features, e.g., 3-way calling, video conferencing, etc.; such features would be invoked by the service provider network 113. The correlation can be performed for each feature and/or service indicated in the device profile of the non-native user. In step 607, the correlated features and/or services are temporarily activated on the non-native device. Furthermore, the non-native user may have data (e.g., music, applications, etc.) maintained within the network 113 of the service provider; this can be indicated in the device profile information so that this data is made available to the non-native user via the borrowed device.

It is contemplated that the above emulation activities can be performed after authentication of the non-native user.

FIG. 7 is a diagram of a mobile device configured to acquire biometric data from a user, according to one embodiment. Mobile device 700 may comprise computing hardware (such as described with respect to FIG. 7), as well as include one or more components configured to execute the processes described herein for facilitating the remote tracking services of system 100. In this example, mobile device 700 includes application programming interface(s) 701, a biometric scanner 703, communications circuitry 705, and user interface 707. While specific reference will be made hereto, it is contemplated that mobile device 700 may embody many forms and include multiple and/or alternative components.

According to exemplary embodiments, user interface 705 may include one or more displays 709, keypads 711, microphones 713, and/or speakers 715. Display 709 provides a graphical user interface (GUI) that permits a user of mobile device 700 to view dialed digits, call status, menu options, and other service information. The GUI may include icons and menus, as well as other text and symbols. Keypad 709 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 711 coverts spoken utterances of a user (or other auditory sounds, e.g., environmental sounds) into electronic audio signals, whereas speaker 713 converts audio signals into audible sounds.

Communications circuitry 705 may include audio processing circuitry 721, controller 723, location module 725 (such as a GPS receiver) coupled to antenna 727, memory 729, messaging module 731, transceiver 733 coupled to antenna 735, and wireless controller 737 coupled to antenna 739. Memory 729 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 729 may be implemented as one or more discrete devices, stacked devices, or integrated with controller 723. Memory 729 may store information, such as one or more user profiles, one or more user defined policies, one or more contact lists, personal information, sensitive information, work related information, etc.

Additionally, it is contemplated that mobile device 700 may also include one or more applications and, thereby, may store (via memory 729) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 700 from, for example, platform 103 may be utilized by API(s) 701 and/or controller 723 to facilitate remotely configuring, modifying, and/or utilizing one or more features, options, settings, etc., of these applications. It is also contemplated that these (or other) control signals may be utilized by controller 723 to facilitate remotely backing up and/or erasing data associated with these applications. In other instances, the control signals may cause mobile device 700 to become completely or partially deactivated or otherwise inoperable.

Accordingly, controller 723 controls the operation of mobile station 700, such as in response to commands received from API(s) 701 and/or data stored to memory 729. Control functions may be implemented in a single controller or via multiple controllers. Suitable controllers 723 may include, for example, both general purpose and special purpose controllers and digital signal processors. Controller 723 may interface with audio processing circuitry 721, which provides basic analog output signals to speaker 719 and receives analog audio inputs from microphone 713.

In exemplary embodiments, controller 723 may be controlled by API(s) 701 in order to capture signals from biometric scanner 703 or microphone 713 in response to control signals received from platform 103. In other instances, controller 723 may be controlled by API(s) 701 to cause location module 725 to determine spatial positioning information corresponding to a location of mobile device 700. Still further, controller 723 may be controlled by API(s) 701 to image (e.g., backup) and/or erase memory 729, to configure (or reconfigure) functions of mobile device 700, to track and generate device usage logs, or to terminate services available to mobile device 700. It is noted that captured signals, device usage logs, memory images, spatial positioning information, and the like, may be transmitted to platforms 101 and/or 105 via transceiver 733 and/or wireless controller 737. In this manner, the captured signals and/or other forms of information may be presented to users and stored to one or more networked storage locations, or any other suitable storage location or memory of (or accessible to) the components and facilities of system 100.

It is noted that real time spatial positioning information may be obtained or determined via location module 725 using, for instance, satellite positioning system technology, such as GPS technology. In this way, location module 725 can behave as (or substantially similar to) a GPS receiver. Thus, mobile device 700 employs location module 725 to communicate with constellation of satellites. These satellites transmit very low power interference and jamming resistant signals received by GPS receivers 725 via, for example, antennas 727. At any point on Earth, GPS receiver 725 can receive signals from multiple satellites, such as six to eleven. Specifically, GPS receiver 725 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 700 is able to identify signals from at least four satellites, receivers 725 may decode the ephemeris and clock data, determine the pseudo range for each satellite and, thereby, compute the spatial positioning of a receiving antenna 727. With GPS technology, mobile device 700 can determine its spatial position with great accuracy and convenience. It is contemplated, however, that location module 725 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like.

Mobile device 700 also includes messaging module 731 that is configured to receive, transmit, and/or process messages (e.g., EMS messages, SMS messages, MMS messages, IM messages, electronic mail messages, and/or any other suitable message) received from (or transmitted to) platform 105 or any other suitable component or facility of system 100. As previously mentioned, platform 105 may transmit control singles to mobile device 700 in the form of one or more API 701 directed messages, e.g., one or more BREW directed SMS messages. As such, messaging module 731 may be configured to identify such messages, as well as activate API(s) 701, in response thereto. Furthermore, messaging module 731 may be further configured to parse control signals from these messages and, thereby, port parsed control signals to corresponding components of mobile device 700, such as API(s) 701, controller 723, location module 725, memory 729, transceiver 733, wireless controller 737, etc., for implementation.

According to exemplary embodiments, API(s) 701 (once activated) is configured to effectuate the implementation of the control signals received from platforms 101, 105. It is noted that the control signals are utilized by API(s) 701 to, for instance, remotely control, configure, monitor, track, and/or capture signals from (or related to) biometric scanner 703, communications circuitry 705, and/or user interface 707. In this manner, visual and/or acoustic indicia pertaining to an environment surrounding mobile device 700 may captured by API(s) 701 controlling biometric scanner 703 and microphone 713. Other control signals to cause mobile device 700 to determine spatial positioning information, to image and/or erase memory 729, to configure (or reconfigure) functions, to track and generate device usage logs, or to terminate services, may also be carried out via API(s) 701. As such, one or more signals captured from biometric scanner 703 or microphone 713, or device usage logs, memory images, spatial positioning information, etc., may be transmitted to platform 103 via transceiver 733 and/or wireless controller 737, in response to corresponding control signals provided to transceiver 733 and/or wireless controller 737 by API(s) 701. Thus, captured signals and/or one or more other forms of information provided to platform 105 may be presented to users and/or stored to repository 105, or any other suitable storage location or memory of (or accessible to) the components and facilities of system 100.

It is also noted that mobile device 700 can be equipped with wireless controller 737 to communicate with a wireless headset (not shown) or other wireless network. The headset can employ any number of standard radio technologies to communicate with wireless controller 737; for example, the headset can be BLUETOOTH enabled. It is contemplated that other equivalent short range radio technology and protocols can be utilized. While mobile device 700 has been described in accordance with the depicted embodiment of FIG. 7, it is contemplated that mobile device 700 may embody many forms and include multiple and/or alternative components.

The described processes and arrangements, according to certain embodiments, advantageously permit users to conveniently employ wireless devices that are not "tied" or registered to them, thereby enabling greater flexibility for users to utilized wireless communication services. Moreover, these service providers can continue to service users, even though users are not able to authenticate themselves using conventional techniques, such as a SIM card.

The processes for authenticating non-native users are described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
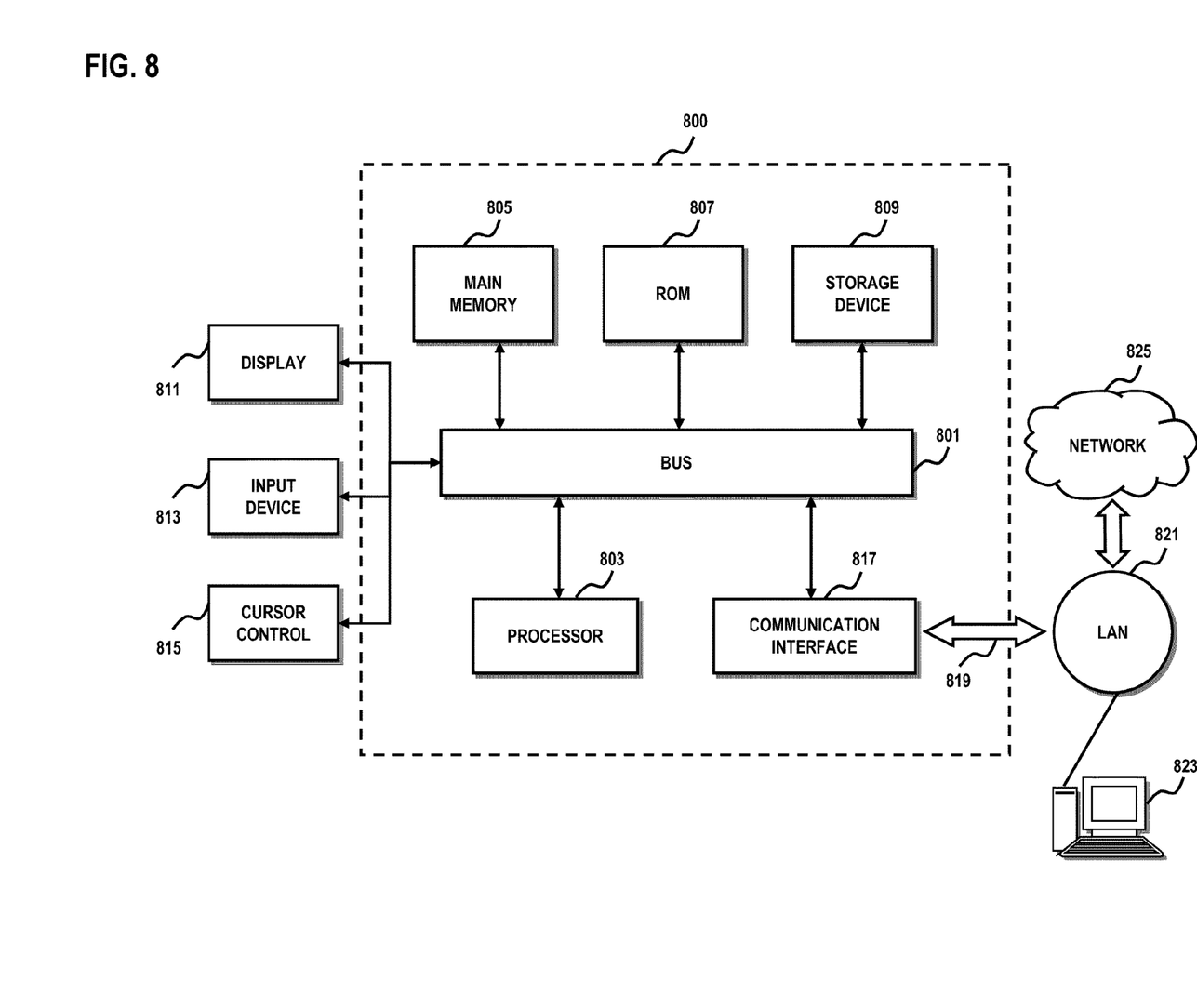
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting and determining by a mobile device that a user of the mobile device is not registered with a service provider to utilize the mobile device;
   collecting at the mobile device authentication information supplied by the user;

generating by the mobile device a request, including the authentication information, to utilize a communication service of the service provider; and selectively receiving by the mobile device, in response to the request, an acknowledgement message granting permission for the user to utilize the communication service if the authentication information is valid;

wherein collecting authentication information comprises initiating, by the mobile device, a biometric scan of the user to obtain biometric data, the authentication information including the biometric data; and wherein the mobile device is registered to another user.

2. A method according to claim 1, wherein the detecting step is based on absence of a user identification module within the mobile device, and the user is restricted to temporary use of the communication service, the method further comprising:

retrieving a device profile for a registered mobile device of the user;

determining a functionality from the device profile of the registered mobile device; and initiating activation of the functionality on the mobile device.

3. A method according to claim 1, wherein the user is declared by the service provider as a non-native user to permit the user to utilize a data channel, the method further comprising:

downloading a packetized voice application to a mobile device if the packetized voice application is determined as not resident within the mobile device; and initiating establishment of a voice communication session over the data channel using the packetized voice application.

4. An apparatus comprising:

a processor configured to detect that a user of the apparatus, which is a mobile device, is not registered with a service provider to utilize the mobile device and to collect authentication information supplied by the user; and a memory coupled to the processor and configured to store the collected authentication information, wherein the processor is further configured to generate a request, including the authentication information, to utilize a communication service of the service provider, and to selectively receive, in response to the request, an acknowledgement message granting permission for the user to utilize the communication service if the authentication information is valid;

wherein the processor is further configured to initiate, via a biometric scanner coupled to the mobile device, a biometric scan of the user to obtain biometric data, the authentication information including the biometric data; and wherein the mobile device is registered to another user.

5. An apparatus according to claim 4, wherein the detection is based on absence of a user identification module within the mobile device, and the user is restricted to temporary use of the communication service, the apparatus further comprising:

an emulator configured to retrieve a device profile for a registered mobile device of the user, to determine a functionality from the device profile of the registered mobile device, and to initiate activation of the functionality on the mobile device.

6. An apparatus according to claim 4, wherein the user is declared by the service provider as a non-native user to permit the user to utilize a data channel, the processor is further configured to download a packetized voice application to a mobile device if the packetized voice application is not resident within the mobile device, and to initiate establishment of a voice communication session over the data channel using the packetized voice application.

7. A method comprising:

receiving at a service provider a request directed to a phone directory number of a user of a mobile device to use a communication service of the service provider, wherein the request includes authentication information of the user of the mobile device;

determining that the user is not registered with the service provider to use the communication service from the mobile device;

extracting the authentication information from the request;

determining whether the extracted authentication information is valid; and generating, in response to the request, an acknowledgement message granting permission for the user to utilize the communication service from the mobile device if the authentication information is determined to be valid.

8. A method according to claim 7, further comprising:

determining that the mobile device is registered to another user, and the user is restricted to temporary use of the communication service;

determining that the user is associated with another mobile device; and initiating downloading of device configuration information associated with the other mobile device to the mobile device.

9. A method according to claim 7, wherein the authentication information includes biometric data, and the mobile device initiates a biometric scan of the user to obtain the biometric data.

10. A method according to claim 7, further comprising:

retrieving stored authentication information from a database maintained by the service provider; and comparing the stored authentication information with the extracted authentication information to determine whether the extracted authentication information is valid.

11. A method according to claim 7, further comprising:

allocating a data channel to support a voice communication session from the non-registered user of the mobile device.

12. A method according to claim 7, wherein the request is received via a voice channel.

13. An apparatus comprising:

a communication interface configured to receive at a service provider a request directed to a phone directory number of a user of a mobile device to use a communication service of the service provider, wherein the request includes authentication information of the user of the mobile device; and a processor coupled to the communication interface and configured to determine that the user is not registered with the service provider to use the communication service from the mobile device, wherein the processor is further configured to extract the authentication information from the request, determine whether the extracted authentication information is valid, and to generate, in response to the request, an acknowledgement message granting permission for the user to utilize the communication service from the mobile device if the authentication information is determined to be valid.

14. An apparatus according to claim 13, wherein the processor is further configured to determine that the mobile device is registered to another user, and the user is restricted to temporary use of the communication service, the processor being further configured to determine that the user is associated with another mobile device, and to initiate downloading of device configuration information associated with the other mobile device to the mobile device.

15. An apparatus according to claim 13, wherein the authentication information includes biometric data, and the mobile device initiates a biometric scan of the user to obtain the biometric data.

16. An apparatus according to claim 13, wherein the processor is further configured to retrieve stored authentication information from a database maintained by the service provider, and to compare the stored authentication information with the extracted authentication information to determine whether the extracted authentication information is valid.

17. An apparatus according to claim 13, wherein the processor is further configured to allocate a data channel to support a voice communication session from the non-registered user of the mobile device.

* * * * *